UNITED STATES PATENT OFFICE.

THOMAS J. MAYALL, OF ROXBURY, MASSACHUSETTS.

IMPROVEMENT IN THE MANUFACTURE OF WATER-PROOF HOSE.

Specification forming part of Letters Patent No. 26,276, dated November 29, 1859.

*To all whom it may concern:*

Be it known that I, THOMAS J. MAYALL, of Roxbury, in the county of Norfolk and State of Massachusetts, have invented certain new and useful Improvements in the Manufacture of Hose or Tubing; and I hereby declare that the following description forms a full and exact specification of the same, wherein I have set forth the nature and principles of my said improvements by which my invention may be distinguished from all others of a similar class, together with such parts as I claim and desire to have secured to me by Letters Patent.

In the various kinds of india-rubber or gutta-percha hose or tubing heretofore manufactured for conveying liquids, the woven fabric used is covered or coated with rubber or gutta-percha and then wound or wrapped around a mandrel in one or any desired number of folds. Another kind of hose for which I have made application for separate Letters Patent, and to which the present invention is equally applicable, consists of a woven fabric coated on the inside or on both the inside and outside with india-rubber or gutta-percha; but the woven fabric often becomes saturated with water and rots before it becomes dry, while the chemical action of the sulphur and other articles used in the composition of india-rubber or gutta-percha produce a similar effect upon the woven fabric, causing it in time to deteriorate and decay.

The object of my invention is to so prepare the fibrous fabric in whatever form it may be used so that it shall possess such properties as to resist both the action of water and that of sulphur and the other articles combined with the rubber or gutta-percha upon it, whereby when coated with rubber or gutta-percha and made into hose or tubing in any proper manner it will not be subject to decay, and will render the hose or tubing very durable.

The mode I employ is to treat the fibrous fabric with corrosive sublimate, chloride of zinc, pyrolignite of iron, oil of tar, and other bituminous, pitchy, and resinous matters, or any other similar substances, either by immersing the fabric and afterward drying it or by placing it in any suitable vessel and exhausting the air, so that the preservative solution will be forced in by pressure or in any other proper manner.

The strength of the solution and the length of time that the fabric shall remain in it can of course be varied; but the strength of the liquid and the time occupied should be sufficient to cause the fabric to be thoroughly impregnated. The fabric thus prepared is then coated with india-rubber or gutta-percha in the usual mode and formed into hose or tubing in any proper manner.

What I claim as my invention, and desire to have secured to me by Letters Patent, is—

My improvement in the manufacture of india-rubber or gutta-percha hose or tubing, which consists in impregnating the fibrous fabric which forms the basis thereof with protective or preservative substances, and subsequently coating with india-rubber or gutta-percha and forming the same into hose or tubing, substantially as described.

THOS. J. MAYALL.

Witnesses:
JOSEPH GAVETT,
ALBERT W. BROWN.